Feb. 3, 1925.
J. L. WEBB
VULCANIZING TOOL
Filed Sept. 19, 1921
1,524,769
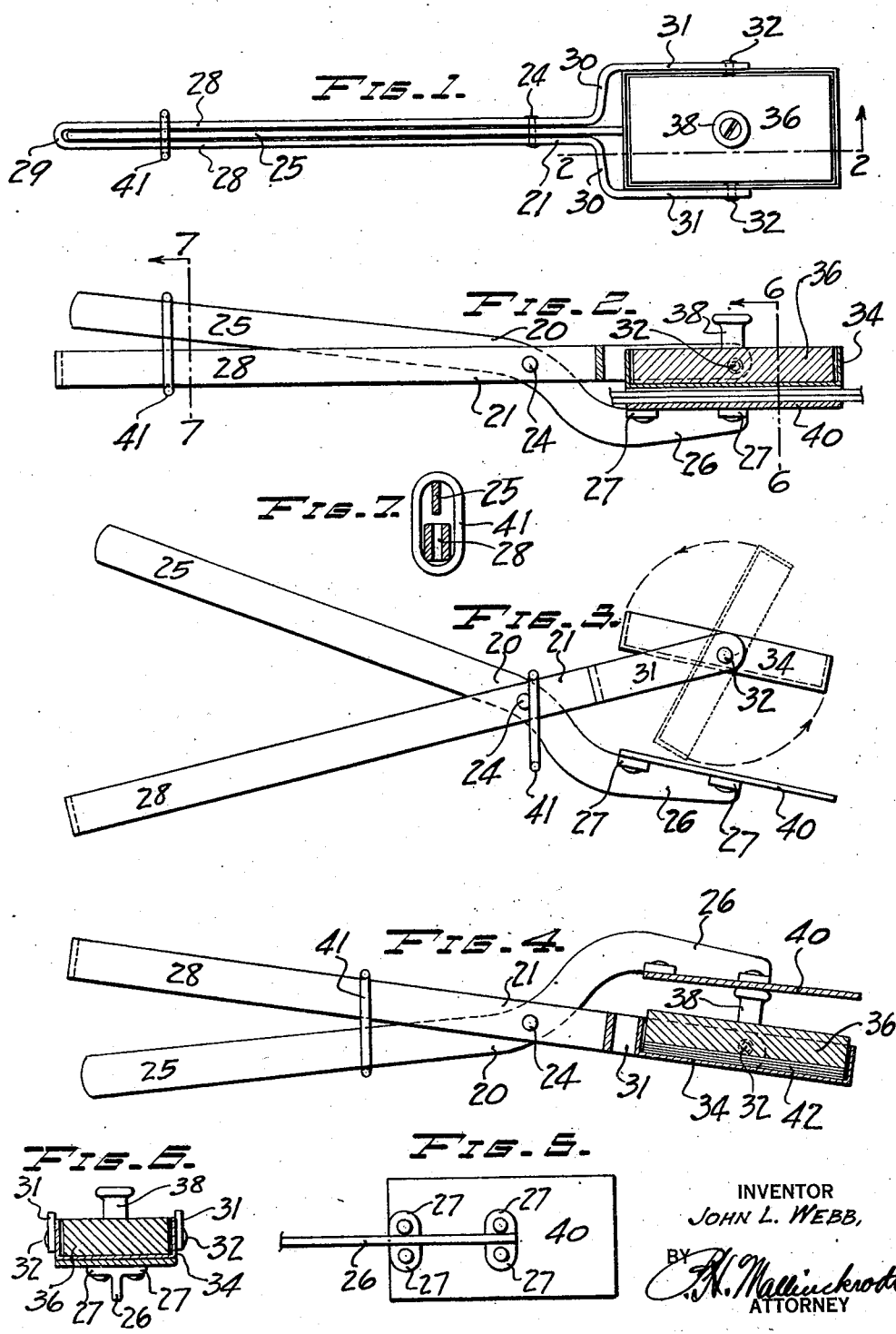
INVENTOR
JOHN L. WEBB,
BY
ATTORNEY Patented Feb. 3, 1925.

1,524,769

UNITED STATES PATENT OFFICE.

JOHN L. WEBB, OF SALT LAKE CITY, UTAH.

VULCANIZING TOOL.

Application filed September 19, 1921. Serial No. 501,847.

*To all whom it may concern:*

Be it known that I, JOHN L. WEBB, a citizen of the United States, and a resident of Salt Lake City, county of Salt Lake, and State of Utah, have invented a certain new and useful Vulcanizing Tool, of which the following, together with the accompanying drawing, forms a full, clear, and exact specification, such as will enable others skilled in the art to which it appertains to make and use the same.

This invention relates to a vulcanizing tool, and its principal objects are:

First. To provide a light, portable and convenient tool for the purpose of vulcanizing india rubber articles and particularly adapted for applying patches for the repair of the inner tubes of automobile tires.

Second. A tool which may derive the heat necessary for vulcanizing, from the automobile engine, so that the tool may be used whether matches are available or not, and in places where ordinary repair service is unobtainable.

Third. A tool in which all the accessories for the vulcanizing operation may be contained within itself.

Fourth. A tool which shall be simple in construction, economical to manufacture, and durable and effective in use.

In carrying out the objects specified above, a plate, preferably of metal, is provided, this plate being adapted to be placed against one side of the article to be vulcanized. The material for the patch is then brought against the article, and a second plate, also preferably of metal, and having a superficial shape conforming to the first mentioned plate, is placed upon the patch. Means are provided for then clamping the first and second plates together, thus holding securely anything which may be confined between the plates. Any heat-producing or heat-transmitting element may then be placed upon the plate over the material forming the patch, and when the proper degree of heat has been supplied to the patch, the device may be removed, which completes the repairing operation.

The novelty of the present invention consists in the method of clamping the plates, between which the work is held, and in the manner of supplying the heat for the vulcanizing operation, as well as in the manner of providing a convenient place for storage of the material needed in patching, when the tool is not in active use.

The clamping is accomplished by means of a structure designed somewhat after the manner of an ordinary pair of tongs, two lever members being pivoted together to form a fulcrum and providing a pair of handles of suitable length on one side of the fulcrum, with a pair of suitably formed jaws on the other side of the fulcrum, the leverage from handles to jaws, being properly proportioned so that the requisite amount of pressure may be obtained between the jaws. One of the plates may be rigidly attached to one of the jaws in transverse relation to the plane in which the jaw moves. The opposite jaw may be in the form of a fork adapted to have the second plate pivotally supported therein, and the second plate may have sides and ends to form a pan-like element. The bottom is smooth and is adapted to be brought against the working face of the first mentioned plate, the pivot allowing the pan to adapt itself to the position of the plate. By inserting the object to be operated upon, between the plate and the pan, and bringing the lever arms together the clamping action referred to above, is obtained. Now, by having a ring or link, which may be slipped over the lever arms, the requisite pressure upon the material between the jaws may be continued indefinitely.

In order to supply the heat for vulcanizing, a solid body of metal may be provided, which may be heated at any convenient source, for instance, by laying it on the hot automobile engine, and then placing the said body in the pan. When sufficient heat has been applied to the patch, the tool may be removed, thus completing the operation.

The features of this invention for which the protection of Letters Patent is desired, are collectively grouped in the claims, which form the conclusion of this specification.

In the drawing, which illustrates one embodiment of the present invention,

Fig. 1 represents a plan view;

Fig. 2, a vertical section on line 2—2 in Fig. 1;

Fig. 3, a side elevation showing parts in an alternate position;

Fig. 4, a view similar to Fig. 2, but showing parts of the device in another alternate position;

Fig. 5, a fragmentary plan view opposed to the view in Fig. 1;

Fig. 6, a vertical section on line 6—6 in Fig. 2;

Fig. 7, a vertical section on line 7—7, Fig. 2.

Throughout the different views, similar parts are designated by similar numerals.

Referring to the drawing, 20 and 21 represent two levers which are pivoted together at the common fulcrum 24 to form an implement resembling a pair of tongs. The lever 20 has the long arm 25 in the form of a handle with the short arm 26, which latter may carry the integral lugs 27. The lever 21 may be formed as shown in Fig. 1, where the long arm 28 of the lever, has the shape of an upwardly elongated letter U with its bend 29, at the extremity of the long lever arm, while the extremities of the legs of the U may be bent to form a fork as shown at 30 and 31 in Fig. 1. Near the extremities of its two branches, the fork carries the pivots 32, which in turn, oscillatingly support the pan or other suitable element 34 adapted to bear against the work. The bottom 35 of the pan 34 may be perfectly plane and smooth for flat work, or have any other suitable shape (not shown) as may be required.

A body 36, preferably of metal, and having a mass sufficient to store the requisite amount of heat, is adapted to be loosely set into the pan 34, and to have its bottom face 37 in close contact with the bottom of the pan. A knob or handle 38, made preferably of a non-heat conducting material, may be provided for lifting the body 36. A plate 40, which may be flat or of any other suitable shape, may be fastened to the lugs 27 of the arm 26, and be adapted to bear against the opposite side of the work.

A link 41, adapted to slip over the handles 25 and 28, is provided for holding the tool in the clamped position.

The form in which this tool is ordinarily carried in the automobile tool-box, ready for use, is illustrated in Fig. 4. In this form, the pan 34 contains a supply of material 42 for making patches, the body 36 being placed on top of the patch material and held in place thereon, by the plate 40, which is pressed down by the lever arm 26 and is held securely in the closed position by the link 41, as indicated in Fig. 4.

In using the device, the link 41 is pushed toward the pivot 24, which allows the handles 25 and 28 to be opened, and the body 36 and the patch material 42 to be removed from the pan 34. The vertical position of the tool, as shown in Fig. 4, is then reversed, the pan being swung around the pivots 32 until it occupies about the position shown in Fig. 3. The articles to be vulcanized, may then be laid on the plate 40 and the patch material laid on top of the article. The handles 25 and 28 may then be brought together, which forces the pan 34 down, and squeezes the patch against the article which it is desired to repair. When the requisite pressure has been reached, the link 41 is pulled back sufficiently to maintain that pressure. The body 36, which meanwhile may have been placed upon the hot automobile engine, or which may have been heated in any other desired manner, is laid in the pan 34, the heat transmitted therefrom, in due time causing the vulcanizing action to take place between the patch and the article to which it has been applied. When the repairing has been completed, the patch material may again be stored in the pan 34, and after cooling the body 36, the tool may be put away again for future use, in the form shown in Fig. 4.

The method illustrated, of forming and combining the levers 20 and 21, has been evolved with a view to simplicity and economical manufacture.

While a specific embodiment of this invention is herein shown and described, it is to be clearly understood that the detailed parts thereof, may, or may not, be shown in the preferred forms, and further that the preferred forms may be varied from time to time, as the development of this invention and the arts with which it is identified, progress.

To the skilled inquirer, therefore, that, which forms an essential and characteristic part of this invention will be readily discernible from the claims in which its spirit is broadly generalized.

Having fully described my invention, what I claim is:

1. In a vulcanizing tool, the combination with a bearing member, of a second bearing member adapted to transmit heat reversibly mounted to have operative and inoperative positions, means for clamping the said bearing members together, and a removable body adapted to absorb heat from an extraneous source and to impart this heat to the said second bearing member in the said operative position.

2. In a vulcanizing tool, the combination with two levers pivoted to each other, forming arms, of a bearing member carried by one of the arms, a heat-transmitting member reversibly pivoted to the arm opposed to the said bearing member and arranged to register therewith in an operative position and in an inoperative position, and a removable body adapted to absorb heat from an extraneous source, the said body being further adapted for imparting its heat to the heat-transmitting member in the operative position and to be retained therein in the inoperative position.

3. In a vulcanizing tool, the combination with a lever lying mainly in a plane, a second lever having a U-portion adapted to straddle the first mentioned lever, a fulcrum pin connecting the two levers, a fork portion projecting from the said U-portion, a pan-like heat-transmitting member reversibly pivoted in the said fork, a bearing member opposed to the said heat-transmitting member and supported by the opposing lever, and a removable body for absorbing heat from an extraneous source, the said body being adapted for placing on the said heat-transmitting member to impart heat thereto in one position and to be retained therein for safe keeping in the reversed position of the heat-transmitting member.

4. In a vulcanizer, the combination with a lever lying mainly in a plane, a second lever having a U-portion paralleling and adapted to straddle, the first mentioned lever, a fulcrum pin connecting the two levers, a bearing member carried by the first mentioned lever and extending transversely thereof, a pan-like heat-transmitting member pivotally mounted on the second lever in a position opposed to the said bearing member, the said pivotal mounting allowing an equalized pressure between the heat-transmitting member and the bearing member when the levers are compressed, and a body adapted to absorb heat and to impart the said heat to the said heat-transmitting member.

5. In a vulcanizer, the combination with two levers pivoted to each other, forming two pairs of arms, of a bearing member carried by one of the arms, a heat-transmitting pan pivoted to the arm opposed to the said bearing member, the said pan being adapted to have a vulcanizing position and a storing position, relatively to the said bearing member, and a body adapted to absorb heat from an extraneous source, the said body being adapted to fit the said pan for the purpose of imparting heat thereto in the vulcanizing position and to hold material for storage in the said pan when the latter is in the storing position.

6. In a vulcanizing tool, the combination with two levers pivoted to each other in a common fulcrum, one of the said levers lying mainly in a plane, the other lever having one of its arms formed in the shape of the letter U, and adapted to have the corresponding arm of the other lever operate in the space between the legs of the U, a fork formed at the open extremities of the U-legs, a clamping member oscillatingly supported in the said fork, a second clamping member carried by the other lever, the two said clamping members being opposed to each other and adapted to have suitable material clamped therebetween, and means for absorbing heat from an extraneous source and for imparting heat to the material held between the said clamping members.

In testimony whereof, I sign my name hereto.

JOHN L. WEBB.